United States Patent Office 2,792,629
Patented May 21, 1957

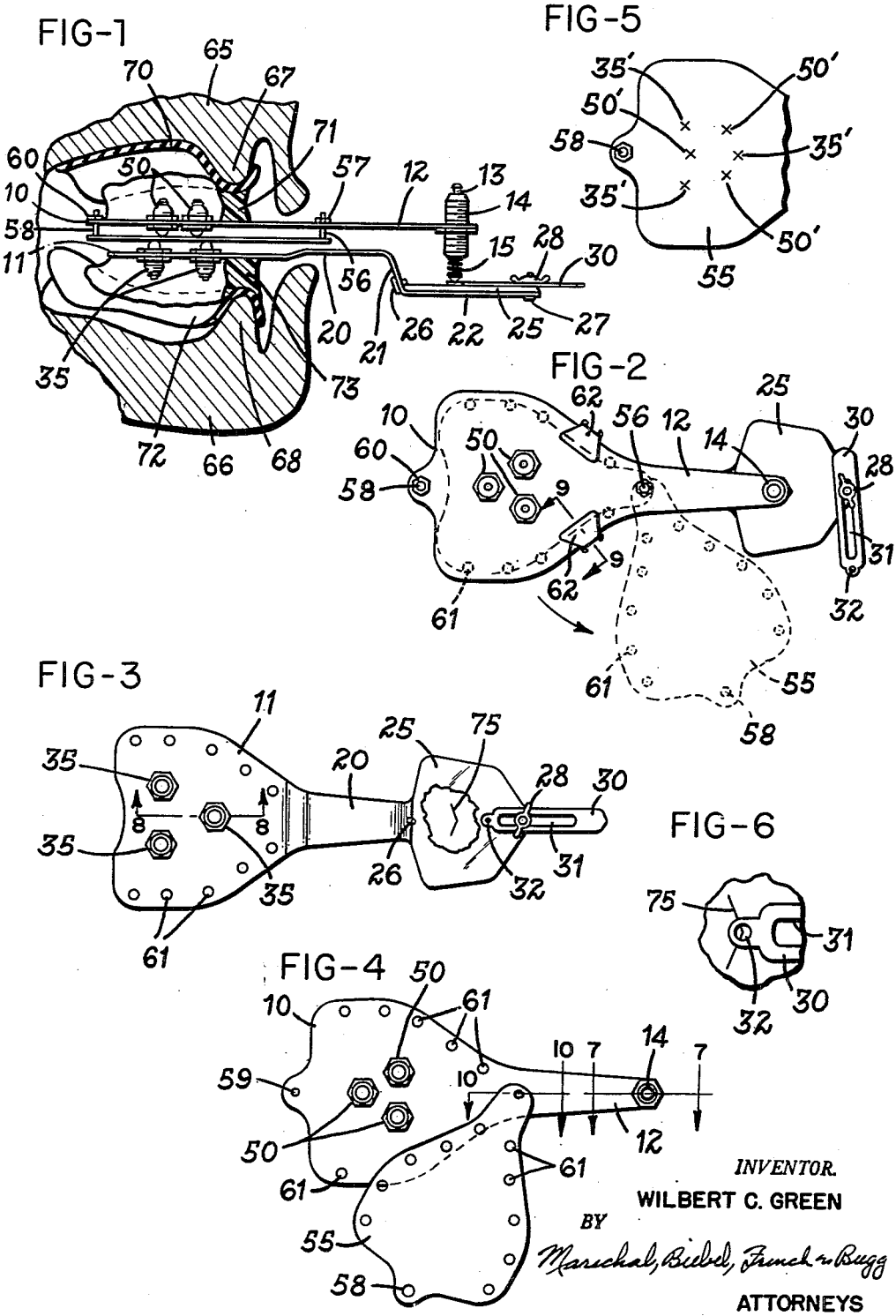
May 21, 1957      W. C. GREEN      2,792,629
CENTERING DEVICE FOR ARTIFICIAL DENTURES
Filed Jan. 18, 1956      4 Sheets-Sheet 1
INVENTOR.
WILBERT C. GREEN
BY
Marechal, Biebel, French & Bugg
ATTORNEYS May 21, 1957 W. C. GREEN 2,792,629
CENTERING DEVICE FOR ARTIFICIAL DENTURES
Filed Jan. 18, 1956 4 Sheets-Sheet 2
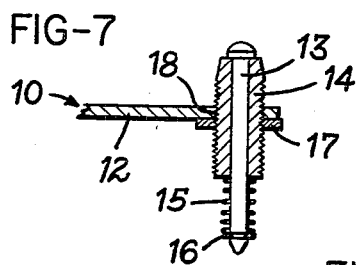
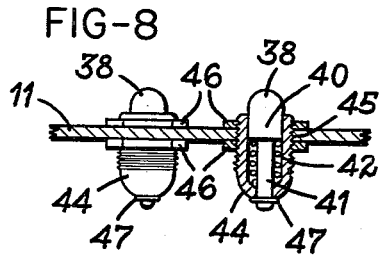
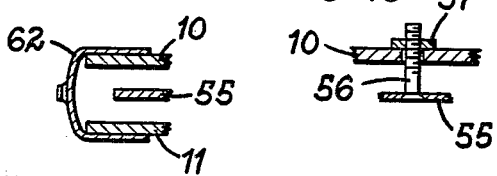
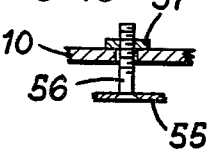
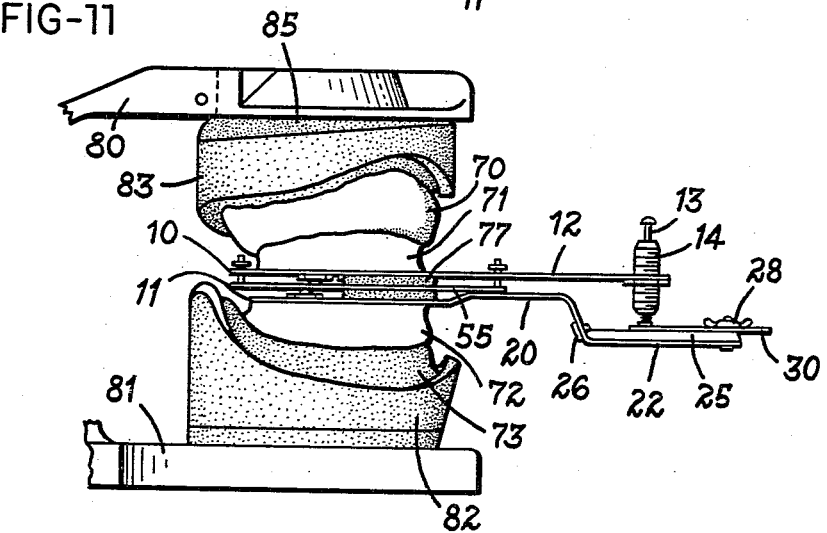
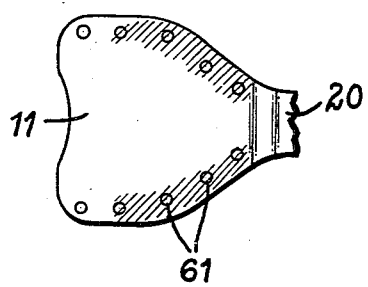
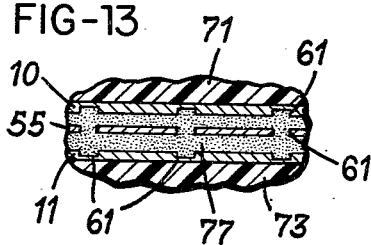
INVENTOR.
WILBERT C. GREEN
BY
*Marechal, Biebel, French & Bugg*
ATTORNEYS

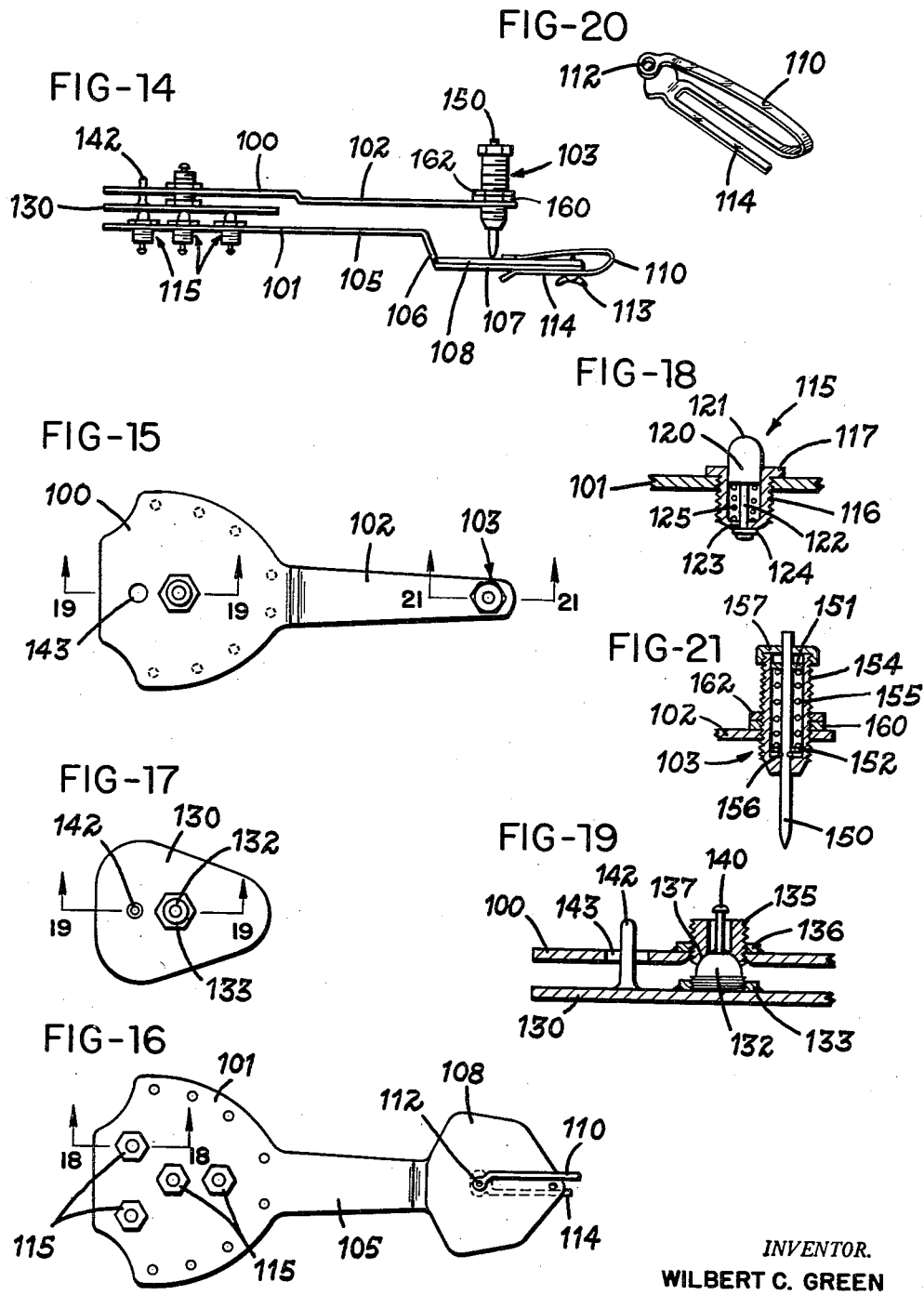

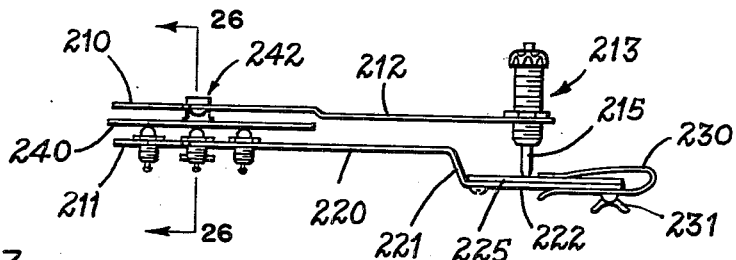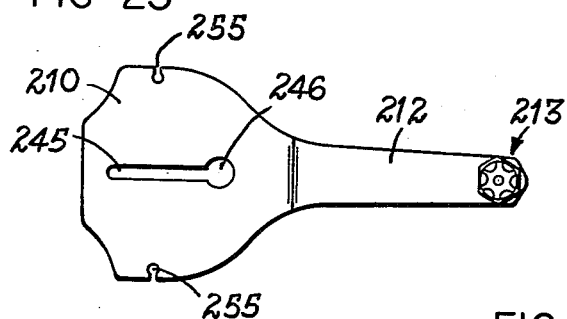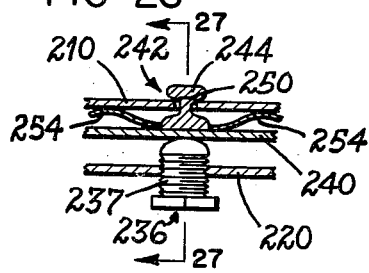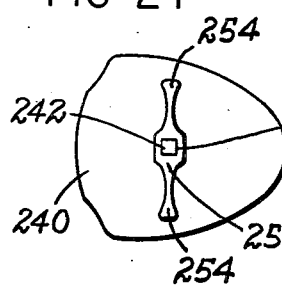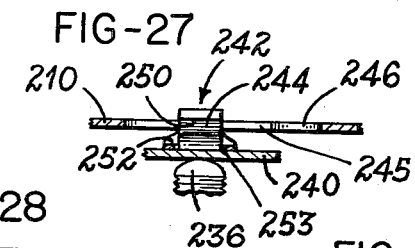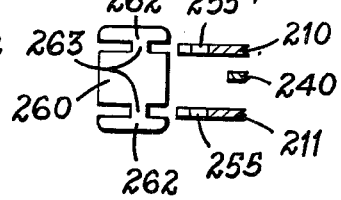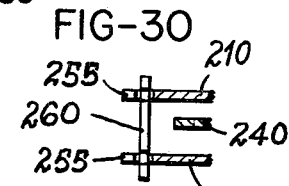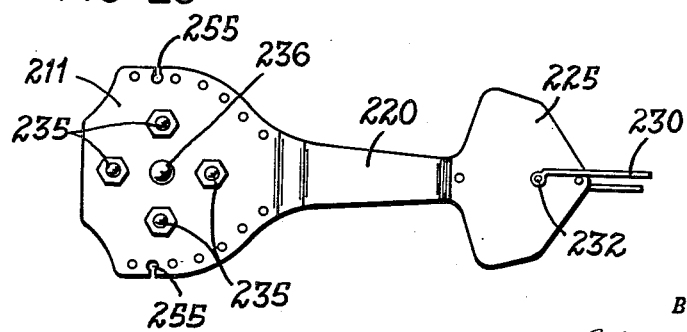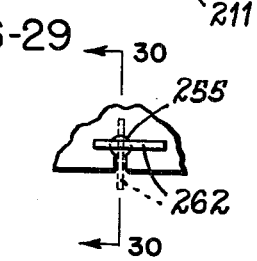

2,792,629

CENTERING DEVICE FOR ARTIFICIAL DENTURES

Wilbert C. Green, Dayton, Ohio; Sophia R. Green, executrix of said Wilbert C. Green, deceased Application January 18, 1956, Serial No. 559,812

8 Claims. (Cl. 32—19)

This invention relates to an instrument for use in the manufacture of artifical dentures.

The invention has special relation to an instrument of this character for employment by the dentist for the purpose of determining the proper vertical relation in which artificial dentures are to be constructed. More particularly, the invention is directed to the elimination of guesswork with respect to this vertical relationship by establishing a positively indexed relation of such jaw models with respect to the true centric position for the particular patient. This application is a continuation-in-part of my copending application Serial No. 437,617, filed June 18, 1954 now Patent No. 2,738,583.

It is a primary object of the present invention to provide an improved instrument of the above type which is of such construction that the operating parts thereof, together with bite blocks carried thereby, may be releasably secured together in positively indexed relation with respect to centric such that the instrument and the bite blocks can be transferred to an articulator with the assurance that the true centric relationship of the patient's jaws will be reproduced in the articulator and the dentures constructed thereon.

An additional object of this invention is to provide such an instrument which accurately reflects a wide range of variations in the hardness of the patient's mouth in addition to establishing the centric position of the patient's jaws.

A further object of this invention is to provide for a maximum adjustment in the instrument between non-parallel positions of the bite blocks with a minimum of total thickness of the instrument, and in particular to provide an instrument which is even more flexible in its use than the instrument described in my above mentioned copending application.

Still another object of this invention is to provide such an instrument which operates in part by tracing or scribing a Gothic arch pattern indicating the centric position of the patient's jaws and in which such Gothic arch pattern is reproduced entirely exteriorly of the patient's mouth for viewing of the dentist as it is produced.

Other objects and advantages of the invention will be apparent from the following description, the accompanying drawings and the appended claims.

In the drawings—

Fig. 1 is a diagrammatic view taken in vertical section through the mouth of the patient, and showing the instrument of the invention in operative position in the mouth with the bite blocks secured to the instrument;

Fig. 2 is a top plan view of the instrument shown in Fig. 1;

Fig. 3 is a detail view of the upper surface of the lower plate forming one part of the instrument;

Fig. 4 is a view similar to Fig. 3 showing the bottom surface of the top plate of the instrument, and also the bottom surface of the intermediate plate with the latter rotated to a non-working position;

Fig. 5 is a somewhat diagrammatic view of the intermediate plate showing the contact points of the bearing members carried in the upper and lower plates with respect to the intermediate plate;

Fig. 6 is a detail view showing the indexing means carried on the lower plate member for retaining the instrument in centric position with respect to the scribed Gothic arch pattern;

Fig. 7 is an enlarged fragmentary section taken on line 7—7 of Fig. 4;

Fig. 8 is an enlarged fragmentary section on line 8—8 of Fig. 3;

Fig. 9 is an enlarged fragmentary section on line 9—9 of Fig. 2;

Fig. 10 is an enlarged fragmentary section on line 10—10 of Fig. 4;

Fig. 11 is a view similar to Fig. 1 showing the instrument of the invention mounted in combination with the bite blocks between jaw models in an articulator;

Fig. 12 is a detail view of the intermediate plate showing the area thereon to which adhesive is applied as indicated in Fig. 11;

Fig. 13 is an enlarged fragmentary detail of the upper, lower and intermediate plates of the instrument in Fig. 11, showing the arrangement for securing the plates together with plaster or other suitable adhesive;

Fig. 14 is a side view of a modified instrument provided by the invention;

Fig. 15 is a view of the upper surface of the top plate forming one of the parts of the instrument of Fig. 14;

Fig. 16 is a view similar to Fig. 15 showing the upper surface of the lower plate forming another part of the instrument of Fig. 14;

Fig. 17 is a view of the upper surface of an intermediate plate forming another part of the instrument of Fig. 14;

Fig. 18 is an enlarged fragmentary section on line 18—18 of Fig. 16;

Fig. 19 is an enlarged fragmentary section taken on lines 19—19 of Figs. 15 and 17, with the plates illustrated in those two figures in assembled relation;

Fig. 20 is a perspective view of a modified type of indexing arm which may be used on any of the instruments disclosed herein;

Fig. 21 is a vertical section through the scribing member in the instrument of Fig. 15 on the line 21—21;

Fig. 22 is a side view of another instrument provided by this invention;

Fig. 23 is a top plan view of the upper plate of the instrument shown in Fig. 22;

Fig. 24 is a top plan view of the intermediate plate in the instrument of Fig. 22;

Fig. 25 is a top plan view of the lower plate shown in the instrument of Fig. 22;

Fig. 26 is a partial section on an enlarged scale taken on line 26—26 of Fig. 22;

Fig. 27 is an enlarged partial section on line 27—27 of Fig. 26;

Fig. 28 is a composite view on an enlarged scale of a retaining clip for securing the plates of the instrument of Fig. 22 together when not in use;

Fig. 29 is an enlarged fragmentary view illustrating the clip of Fig. 26 in position to hold the plates of the instrument together; and Fig. 30 is an enlarged fragmentary section taken on line 30—30 of Fig. 29.

Referring to the drawings, which illustrate preferred embodiments of the present invention, Figs. 1–13 show one of the instruments of the invention as comprising a pair of upper and lower plates 10 and 11 which carry the cooperating parts providing for adjustment of the usual bite blocks utilized by the dentist in construction of artificial dentures, as will presently be described. Both of these plates are proportioned to be received within the patient's mouth, and the upper plate 10 includes an elongated arm 12 proportioned to extend a substantial distance outwardly of the mouth as shown in Fig. 1. A scribing unit is carried at the outer end of arm 12 and includes a pin 13 (Fig. 7) mounted for sliding movement in a threaded bushing 14 and biased downwardly by a coil spring 15. A split ring collar 16 holds the pin within the bushing. The bushing 14 is adjustably mounted by a lock nut 17 in a threaded hole 18 near the outer end of arm 12.

The lower plate 11 is generally of the same shape as upper plate 10, and it also includes an outwardly extending arm 20 including a downwardly offset portion 21 terminating in a widened table portion 22 arranged to underlie the scriber pin 13. The table portion 22 supports a recording member 25 which may be of any suitable material having a relatively hard and smooth surface. The member 25 is held on table portion 22 by locking one edge thereof underneath a suitable pin member 26 projecting through the offset arm portion 21, and a threaded screw member 27 extends through the front edge of the table portion and member 25 and receives a wing nut 28 for holding the front edge of the recording member 25. In the operation of the instrument it is necessary to provide an indexing means for the scriber. An arm 30 having an elongated slot 31 therein is received about the screw 27 for slidable adjustment relative to the recording member, and wing nut 28 serves to clamp arm 30 in position when necessary. A small indexing cavity or hole 32 is provided at one end of arm 30 for receiving the tip of scribing pin 13 when it is desired to index the instrument.

A series of three spring-pressed bearing members 35 are provded on lower plate 11 and are shown as arranged in substantially equispaced relation to define the corners of an equilateral triangle. The details of two such bearing members are shown in Fig. 8, wherein the semi-spherical or ball-shaped bearing surface 38 is provided on a plunger 40 having a depending pin portion 41 surrounded by a coil spring 42. The plunger and spring are supported within a hollow bushing or carrier member 44 having a threaded connection at 45 with plate 11, the relative positions of member 45 and the upper surface of plate 11 being controlled by a pair of lock nuts 46. The plunger 40 is retained within carrier 44 by a suitable split ring 47 on the end of pin portion 41, preventing complete movement of the plunger outwardly of carrier 44 under the force of the spring.

Upper plate 10 is also provided with three such bearing members, indicated at 50 in Fig. 4, and of the same general construction as the members 35 just described. The bearing members 50 are arranged substantially the same triangular relation but in the opposite direction with respect to the arrangement of bearing members 35 so that the bearing surfaces of these members will rest upon the surface of the opposite plate 10 or 11, as the case may be, when the instrument is assembled and the upper and lower plates are supported in operative relationship.

An intermediate plate 55 is also provided in this instrument, being of the same general shape as plates 10 and 11, and having a pivotal connection to upper plate 10 through a pin 56 which extends through the upper plate 10 at the frontal portion thereof, adjacent the junction of the main portion of the plate with arm 12. A nut 57 is threaded on the end of pin 56 to retain plate 55 in loose pivotal relation with respect to upper plate 10. At the opposite edge of plate 55 is another pin 58 adapted to extend loosely through an aperture 59 in the rear center portion of plate 10, as shown in Fig. 4. Pin 58 may be secured within aperture 59 by a nut 60 if so desired, although the primary purpose of pin 58 is merely to center the intermediate plate 55 with respect to upper and lower plates 10 and 11.

The intermediate plate 55 provides this instrument with great flexibility in use, particularly for patient's having comparatively wide variation in the hardness of the gums. Thus, the plate 55 is arranged for engagement with the lower bearing members 35 and upper bearing members 50, and the possible tilting movement of plates 10 and 11 with respect to each other is accordingly equal to the total vertical travel of two of these bearing members, providing a correspondingly large tilting angle between the upper and lower plates. Furthermore, the triangular arrangement of bearing members 35 and 50 and the inverted arrangement of these groups of bearing members with respect to each other provides a substantial number of spaced contact points upon the intermediate plate 55, balanced with respect to the center thereof to preclude pre-tilting of the plates with respect to each other when the bearing members are all equally adjusted. The points of contact between bearing members 35 and 50 and plate 55 are shown by X marks in Fig. 5 having primed reference numerals corresponding to the points where corresponding bearing members engage plate 55.

All three of the plates 10, 11 and 55 are provided with apertures 61 through their facing peripheral portions, and these apertures are designed to receive small amounts of adhesive matter such as quick-setting plaster which can be inserted between these portions to secure the plates together temporarily, for a purpose to be described below. During periods of non-use the plates of the instrument may be held together by suitable generally U-shaped clamps 62, such as shown in Figs. 2 and 9. These clamps are removed during operation of the instrument, and form no functional part thereof other than to retain the plates in spaced relation when the instrument is not being used.

A typical application of the instrument for use in the making of artificial dentures will now be described, and accordingly Fig. 1 shows the upper and lower jaw portions 65 and 66 of the patient's mouth, including upper and lower gums 67 and 68 from which the teeth have been removed, and to which it is desired to conform the artificial dentures for a comfortable and correctly functional fit. An upper bite block 70 is secured to upper plate 10 by means of wax 71, and a lower bite block 72 is secured by wax 73 to lower plate 11. The wax portions 71 and 73 are proportioned by the dentist in accordance with the shape of the patient's mouth to locate the bite blocks in such a manner that the facing surfaces of plates 10 and 11 will bear the same spatial relation to each other which the artificial teeth of the patient should bear in their finished form.

If it becomes necessary to move the upper and lower plates 10 and 11 closer together than is possible with the intermediate plate 55 in position, then the rear attachment of this plate at pin 58 may be released, and plate 55 swung or pivoted outwardly about pin 56 to a position outwardly of the mouth, as shown in dotted lines in Fig. 2. The bearing members 35 and 50 will fit between each other, as shown in Fig. 5, and press against opposite surfaces of the upper and lower plates, permitting tilting of these plates with respect to each other. Of course, such tilting will be of a more limited nature than is possible when the intermediate plate 55 is in place.

Before the instrument is inserted in the patient's mouth dye or ink is applied to the upper or recording surface of member 25, or a suitable temporary record sheet can be secured thereto. The instrument is then assembled in the patient's mouth as shown in Fig. 1, and the patient closes his jaws and moves his lower jaw horizontally back and forth between its positions of extreme protrusion and retraction, and extreme left and right lateral movements. This action causes the scribing pin 13 to trace the desired Gothic arch pattern upon recording member 25, as indicated at 75 in Figs. 3 and 6.

With the Gothic arch pattern thus scribed, the dentist then retracts the scribing pin 13 and moves arm 30 until the indexing hole 32 is located at the apex of the Gothic arch pattern, this being the point of true centric relationship of the patient's jaws. The point of pin 13 is inserted in hole 32 to index the upper and lower plates together, and the patient is then instructed to bite with his jaws in concentric relation. With the scribing parts of the instrument clearly visible outside the mouth during this operation the dentist is able to guide his patient's jaws to their centric position if necessary, and he can thus positively establish that the jaws are properly located in their centric relation before proceeding further.

During the biting step, variations in hardness of the patient's mouth or gums, which is a frequent condition, will cause the plates 10 and 11 to move into non-parallel or tilted relationship against the springs 42 providing the biasing force for the bearing members 35 and 50. If the mouth is of uniform hardness, the bearing members will of course be uniformly depressed as the jaws close, but if there are soft spots in the mouth, the bearings will be non-uniformly depressed accordingly.

Once the dentist is satisfied that the bite relationship of the jaws has been established, he secures the plates of the instrument together by introducing small amounts of adhesive such as quick-setting plaster, indicated at 77 in Figs. 11 and 13, between the facing portions of the plates. This plaster will flow into the several holes 61 in the three plates, and will retain the plates in indexed relation. Furthermore, should the plates accidentally come apart, the projections resulting when the adhesive or plaster has entered these holes 61 will serve as a guide to index the plates in proper relation to each other before they are mounted in the articulator.

After the instrument has thus been secured in proper position, it is removed from the patient's mouth and transferred to an articulator. In Fig. 11 the upper and lower arms of a conventional articulator are indicated at 80 and 81. A cast model 82 of the patient's lower jaw is mounted on arm 81. A similar cast model 83 of the upper jaw is mounted on the upper bite block 70, and since the bite blocks have been secured in the proper centric relationship by the instrument, as described above, this automatically aligns the model 83 in centric relation with model 82. With the parts held in this position, the model 83 is rigidly secured to the upper arm 80, as by applying to the top thereof sufficient quick-setting plaster 83 to fill the hollow center portion of arm 80. The jaw models 82 and 83 are thus established in the articulator in properly aligned centric relationship, and the instrument can be removed, cleaned and sterilized for subsequent use.

Figs. 14-19 show a modified instrument in accordance with the invention including an upper plate 100 and a lower plate 101 proportioned to be received within the patient's mouth in the same manner as plates 10 and 11 in the instrument described previously. Plate 100 includes an arm 102 proportioned to extend outwardly of the mouth, and carrying a scribing member 103. Lower plate 101 is provided with a forwardly extending arm 105 having a downwardly offset portion 106 supporting a table portion 107 upon which is secured a plate-like member 108 having a recording surface thereon. An arm 110 having an indexing cavity or aperture 112 (Fig. 16) adapted to receive the point of the scribing pin, is adjustably secured to table portion 107 by a bolt and wing nut 113 passing through a lower bifurcated portion 114 of the arm.

A plurality of bearing members 115 are carried on lower plate 101, one of these bearing members being shown in detail in Fig. 18. The construction of the bearing member is modified somewhat from that shown in Fig. 8, to the extent that the bearing sleeve 116 threaded into plate 101 is provided with an integral shoulder portion 117 for locating the sleeve in fixed relation with respect to the plate upper surface, in contrast with the lock nuts 46 provided in the above described bearing member. A plunger 120 having a rounded upper bearing surface 121 is carried within sleeve 116, and includes a stem 122 extending through an aperture 123 in the lower end of the sleeve and having a snap ring 124 at its lower end outside the sleeve for limiting movement of the plunger upwardly out of the sleeve under the influence of a spring 125.

Four such bearing members are carried on lower plate 101 arranged in a generally Y-outline as shown in Fig. 16, and an intermediate plate 130 is adapted to rest upon bearing members 115. A universal type of bearing connection is provided between plates 100 and 130 by a semi-spherical member 132 threaded at its lower end into a carrier ring 133 which is fixed to the upper surface of plate 130. A socket sleeve 135 is threadedly received in an upper carrier ring 136 fixed to plate 100, and includes a generally concave surface 137 shaped to receive the rounded portion of member 132 in universally movable relation. A pin 140 extending from the tip of member 132 through sleeve 135 limits the tilting movement between plates 100 and 130. A pin 142 is fixed to the upper surface of plate 130 in spaced relation with respect to member 132, and is adapted to extend through an aperture 143 in upper plate 100 to prevent appreciable pivotal movement between the intermediate plate and the upper and lower plates.

Referring to Fig. 21, the modified scribing member 103 includes a pin 150 and upper and lower disk members 151 and 152 slidably received within a threaded bushing 154 and having a spring 155 retained between them. Pin 150 carries a snap ring 156 which engages the lower surface of lower disk 152 and urges this disk upwardly against the resistance of spring 155 when scribing pin 150 is forced upwardly with respect to bushing 154. A cap 157 is threaded to the upper end of bushing 154 to enclose the spring and disk arrangement and to provide an abutment for the upper disk 151. This construction provides for a small amount of play in the scribing member before spring 155 is effective to resist upward movement of pin 150, since the entire assembly of the two disks and the spring may move upwardly a short distance with the pin until upper disk 151 engages cap 157. The scribing unit is mounted at the end of arm 102 by threading into a nut 160 which is suitably secured to the arm, and a lock nut 162 is provided to retain bushing 154 adjustably in position with respect to arm 102.

Figs. 22-30 illustrate another instrument provided by this invention having a pair of upper and lower plates 210 and 211 proportioned to be received within the patient's mouth. Upper plate 210 includes an elongated arm 212 proportioned to extend a substantial distance outwardly of the mouth, and a scribing unit 213 of substantially the same type as illustrated in Fig. 21 is carried at the outer end of arm 212. This unit includes a scribing pin 215 which is substantially identical to the pin 150 described above. Lower plate 211 includes an outwardly extending arm 220 having a downwardly offset portion 221 terminating in a table portion 222 which overlies the scribing unit 213, and which supports a recording member 225 for cooperation with the scribing pin 215. An indexing arm 230, which is shown as identical with the arm 110, is secured to the table portion 222 by means of a wing bolt 231, and it includes at its upper end an indexing hole 232 (Fig. 25) for receiving the tip of pin 215 when it is desired to index the instrument.

Lower plate 211 includes a plurality of spring pressed bearing members 235 arranged symmetrically about a central fixed hemispherical bearing member 236 having a threaded shank 237 thereon (Fig. 26) which provides for adjustment of the height of the central bearing member with respect to plate 211. The bearing members 235 and 236 are all adapted to press against the under surface of an intermediate plate 240 which is of the same general shape as plates 210 and 211. The plate 240 carries on its upper surface a connecting member 242 including an upwardly and outwardly projecting elongated extension 244 providing a generally I-shaped section (Fig. 26) and adapted to be received within a slot 245 extending longitudinally in upper plate 210, as shown in Fig. 23. This slot includes an enlarged forward portion 246 for receiving extension 244 to provide for fitting thereof through the slot.

Extension 244 provides a bearing surface 250 which engages the opposite sides of slot 245 at the top surface of plate 210. A transverse leaf spring 252 is provided with a rectangular opening 253 fitting about member 242 and having upwardly curving arms 254 which urge the bearing surface 250 into contact with plate 210.

This arrangement of the parts provides for a maximum longitudinal adjustment between the upper and lower plates 210 and 211 in accordance with severe conditions of underbite and overbite, while providing for bearing connection between these plates which permits the maximum possible tilting movement of the plates with respect to each other as described above in connection with the instrument of Fig. 1.

The instrument of Fig. 22 also is provided with an improved type of retaining means for holding the plates together during periods of non-use. Upper and lower plates 210 and 211 are provided at opposite sides, and in substantially vertically aligned relation, with slots 255 having enlarged inner ends. Retaining members or clips 260 are provided having generally T-shaped extensions 262 at their upper and lower edges, whereby the vertically extending portions 263 of these extensions may be received within the slots 255 and turned within the enlarged portions thereof to bring the horizontal parts of extensions 262 over the outer surfaces of the upper and lower plates, as shown in Figs. 29 and 30. The dotted position of the retaining clip 260 in Fig. 29 illustrates the initial or inserting position of the clip, while the locking position is shown in full lines.

The operation of the instruments shown in Figs. 4-21 and 22-29 is essentially the same as described in connection with the instrument of Fig. 1. However, the instrument shown in Fig. 22 incorporates the additional advantage of a longitudinal adjustment between the upper and intermediate plates with consequent extension of the movable bearing or tilting relation between the upper and lower plates. In both cases the intermediate plate can be removed from the instrument if necessary. In the instrument shown in Fig. 14 this is accomplished by merely separating the upper and lower plates, whereupon the intermediate plate may be withdrawn. Removal of plate 240 in the instrument of Fig. 22 is effected by sliding this plate to its foremost position, where extension 244 will pass through the enlarged slot portion 246 and permit withdrawal of plate 240. With or without the intermediate plate the use of these instruments is essentially the same as set forth above.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An instrument for use in the manufacture of artificial dentures to establish and record the centric position of the patient's jaws, comprising an upper plate formed for insertion in the patient's mouth in supporting relation with an upper bite block, a lower plate formed for insertion in the patient's mouth in supporting relation with a lower bite block, scribing means on one of said plates, means on the other said plate for cooperation with said scribing means to record a Gothic arch thereon, means for retaining said scribing means in an indexed position at the apex of said Gothic arch, an intermediate plate between said upper and lower plates mounted for tilting movement with respect to both said upper and lower plates, bearing members positioning said plates in normally spaced substantially parallel relation with each other and providing for tilting of all three said plates to non-parallel positions with respect to each other under biting pressure in accordance with variations in hardness of the patient's gums, and portions on said upper and lower plates in facing relation for securing said upper and lower plates together by adhesive while the instrument is under biting pressure for transfer of the bite blocks to an articulator in such non-parallel adjustment with said scribing means indexed at the apex of the Gothic arch.

2. An instrument for use in the manufacture of artificial dentures to establish and record the centric position of the patient's jaws, comprising an upper plate formed for insertion in the patient's mouth in supporting relation with an upper bite block, an upper arm on said upper plate proportioned to project outwardly of the mouth, a lower plate formed for insertion in the patient's mouth in supporting relation with a lower bite block, a lower arm on said lower plate proportioned to project outwardly of the mouth in underlying relation with said upper arm, means on one of said arms for scribing a Gothic arch, means on the other said arm for recording of said Gothic arch thereon, means for providing an indexing hole for said scribing means at the apex of said arch, an intermediate plate between said upper and lower plates mounted for tilting movement with respect to both said upper and lower plates, a plurality of bearing members mounted on said upper and lower plates for engagement with opposite surfaces of said intermediate plate and providing for tilting of all three said plates to non-parallel positions with respect to each other under biting pressure in accordance with variations in hardness of the patient's gums, and portions on said upper and lower plates in facing relation for securing said upper and lower plates together by adhesive while the instrument is under biting pressure for transfer of the bite blocks to an articulator in such non-parallel adjustment with said scribing means indexed at the apex of said Gothic arch.

3. An instrument for use in the manufacture of artificial dentures to establish and record the centric position of the patient's jaws, comprising an upper plate formed for insertion in the patient's mouth in supporting relation with an upper bite block, a lower plate formed for insertion in the patient's mouth in supporting relation with a lower bite block, means on one of said plates for scribing a Gothic arch, means on the other said plate for recording of said Gothic arch thereon, an arm mounted adjacent said recording means and having an indexing hole in one end thereof, means for locating said indexing hole at the apex of said arch to provide for retaining said scribing means thereat, an intermediate plate between said upper and lower plates mounted for tilting movement with respect to both said upper and lower plates, a plurality of bearing members mounted on said upper and lower plates for engagement with opposite surfaces of said intermediate plate and providing for tilting of all three said plates to non-parallel positions with respect to each other under biting pressure in accordance with variations in hardness of the patient's gums, and means for releasably securing said upper and lower plates together while the instrument is under biting pressure for tarnsfer of the bite blocks to an articulator in such non-parallel adjustment with said scribing means indexed at the apex of the Gothic arch.

4. An instrument for use in the manufacture of artificial dentures to establish and record the centric position of the patient's jaws, comprising an upper plate formed for insertion in the patient's mouth in supporting relation with an upper bite block, a lower plate formed for insertion in the patient's mouth in supporting relation with a lower bite block, means on one of said plates for scribing a Gothic arch, means on the other said plate for recording of said Gothic arch thereon, means for providing an indexing hole for said scribing means at the apex of said arch, an intermediate plate between said upper and lower plates mounted for tilting movement with respect to both said upper and lower plates, a plurality of spring-biased bearing members mounted on said upper and lower plates for engagement with opposite surfaces of said intermediate plate to provide for tilting of all three said plates to non-parallel positions with respect to each other under biting pressure in accordance with variations in hardness of the patient's gums, said upper and lower plates having a plurality of perforations along the peripheries thereof providing for positive fixation of said upper and lower plates by cementing said upper and lower plates together while the instrument is under biting pressure, and said instrument providing for transfer of the bite blocks to an articulator in such non-parallel adjustment with said scribing means indexed at the apex of the Gothic arch.

5. An instrument for use in the manufacture of artificial dentures to establish and record the centric position of the patient's jaws, comprising an upper plate formed for insertion in the patient's mouth in supporting relation with an upper bite block, a lower plate formed for insertion in the patient's mouth in supporting relation with a lower bite block, means on one of said plates for scribing a Gothic arch, means on the other said plate for recording of said Gothic arch thereon, means for providing an indexing hole for said scribing means at the apex of said arch, an intermediate plate, means for mounting said intermediate plate between said upper and lower plates for tilting movement with respect to both said upper and lower plates, said mounting means including means providing for pivotal movement of said intermediate plate to a position outside of the patient's mouth and substantially removed from said upper and lower plates, a plurality of spring-biased bearing members mounted on said upper plate for engagement with the adjacent surface of said intermediate plate, a plurality of spring-biased bearing members mounted on said lower plate for engagement with the other surface of said intermediate plate, said bearing members on said upper and lower plates being offset with respect to each other to provide for engagement of said bearing members with the opposite surfaces of said upper and lower plates respectively when said intermediate plate is pivoted out of the patient's mouth, said bearing members providing for tilting movement of all three said plates to non-parallel positions with respect to each other under biting pressure in accordance with variations in hardness of the patient's gums, and means for releasably securing said upper and lower plates together while the instrument is under biting pressure for transfer of the bite blocks to an articulator in such non-parallel adjustment with said scribing means indexed at the apex of the Gothic arch.

6. An instrument for use in the manufacture of artificial dentures to establish and record the centric position of the patient's jaws, comprising an upper plate formed for insertion in the patient's mouth in supporting relation with an upper bite block, a lower plate formed for insertion in the patient's mouth in supporting relation with a lower bite block, means on one of said plates for scribing a Gothic arch, means on the other said plate for temporarily recording said Gothic arch thereon, means for indexing said scribing means at the apex of said arch, an intermediate plate between said upper and lower plates mounted for tilting movement with respect to both said upper and lower plates, a plurality of spring-biased bearing members mounted on said lower plates for engagement with the lower surface of said intermediate plate and a universal bearing connection between said upper and said intermediate plates to provide for tilting of all three said plates to non-parallel position with respect to each other under biting pressure in accordance with variations in height and in hardness of the patient's gums, and portions on said upper and lower plates in facing relation for securing said upper and lower plates together by adhesive while the instrument is under biting pressure for transfer of the bite blocks to an articulator in such non-paralleled adjustment with said scribing means indexed at the index of the Gothic arch.

7. An instrument for use in the manufacture of artificial dentures to establish and record the centric position of the patient's jaws, comprising an upper plate formed for insertion in the patient's mouth in supporting relation with an upper bite block, a lower plate formed for insertion in the patient's mouth in supporting relation with a lower bite block, scribing means on one of said plates, means on the other said plate for cooperation with said scribing means to record a Gothic arch thereon, means for retaining said scribing means in an indexed position at the apex of said Gothic arch, an intermediate plate between said upper and lower plates mounted for tilting movement with respect to both said upper and lower plates, bearing member positioning said plates in normally spaced substantially parallel relation with each other and providing for tilting of all three said plates to non-parallel positions with respect to each other under biting pressure in accordance with variations in hardness of the patient's gums, means for providing for longitudinal movement of said intermediate plate with respect to said upper plate, and portions on said upper and lower plates in facing relation for securing said upper and lower plates together by adhesive while the instrument is under biting pressure for transfer of the bite blocks to an articulator in such non-parallel adjustment with said scribing means indexed at the apex of the Gothic arch.

8. An instrument for use in the manufacture of artificial dentures to establish and record the centric position of the patient's jaws, comprising an upper plate formed for insertion in the patient's mouth in supporting relation with an upper bite block, a lower plate formed for insertion in the patient's mouth in supporting relation with a lower bite block, means on one of said plates for scribing a Gothic arch, means on the other said plate for temporarily recording said Gothic arch thereon, means for indexing said scribing means at the apex of said arch, an intermediate plate between said upper and lower plates mounted for tilting movement with respect to both said upper and lower plates, a plurality of spring-biased bearing members mounted on said lower plates for engagement with the lower surface of said intermediate plate and a bearing connection between said upper and said intermediate plates to provide for tilting of all three said plates to non-parallel position with respect to each other under biting pressure in accordance with variations in height and in hardness of the patient's gums, said bearing connection between said upper and said intermediate plates being movable longitudinally of said upper plate to provide for longitudinal adjustment of said intermediate plate with respect to said upper plate, and portions on said upper and lower plates in facing relation for securing said upper and lower plates together by adhesive while the instrument is under biting pressure for transfer of the bite blocks to an articulator in such non-paralleled adjustment with said scribing means indexed at the index of the Gothic arch.

No references cited.